March 3, 1964     L. G. SHARP     3,123,136
METHOD OF SECONDARY RECOVERY OF OIL FROM RESERVOIRS
Filed Sept. 29, 1960     2 Sheets-Sheet 1

LORLD G. SHARP
INVENTOR.

BY *H. Matthew Darland*

ATTORNEY

March 3, 1964  L. G. SHARP  3,123,136
METHOD OF SECONDARY RECOVERY OF OIL FROM RESERVOIRS
Filed Sept. 29, 1960  2 Sheets-Sheet 2

LORLD G. SHARP
INVENTOR.
BY H. Matthews Garland
ATTORNEY

3,123,136
METHOD OF SECONDARY RECOVERY OF OIL FROM RESERVOIRS
Lorld G. Sharp, Irving, Tex., assignor to Socony Mobil Oil Company, Inc., a corporation of New York
Filed Sept. 29, 1960, Ser. No. 59,208
16 Claims. (Cl. 166—9)

This invention relates generally to the secondary recovery of oil from subterranean reservoirs. More specifically, this invention is concerned with increasing the recovery of oil from reservoirs by miscible flooding techniques wherein the sweep efficiency of the flooding patterns is improved.

When a well is completed in a subterranean reservoir, the oil present in the reservoir is normally removed through the well by techniques which are generally referred to as primary recovery methods. These methods generally comprise the utilization of native reservoir energy, that is, energy which is inherent to the reservoir for the purpose of driving the oil from the reservoir through a well to the surface of the earth. Native reservoir energy generally manifests itself in the form of a water or gas drive which forces the oil from the pores of the reservoir into the well. That is, water or gas inherent to the reservoir exists in sufficient quantity and at a sufficient pressure that when a pressure differential is established by the penetration of a well into the reservoir, the water or gas will drive the reservoir oil through the reservoir into the well and thence to the surface. Generally, however, primary recovery leaves much of the oil in place within the reservoir because of the fact that the native reservoir energy becomes depleted long before all of the oil present in the reservoir has been driven from it. In order to recover as much oil as possible from a reservoir, it has become common practice to supplement native reservoir energy by the addition of energy from sources outside of the reservoir. The various methods or techniques for providing energy over and above native reservoir energy are generally categorized as secondary recovery methods. These secondary recovery methods may be applied subsequent to the depletion of the native reservoir energy or, in many cases, they are applied at a time prior to the exhaustion of the native reservoir energy.

Among the various methods of secondary recovery of oil which have found common usage in the industry are those which are known as miscible flooding processes or miscible phase displacement techniques. Miscible phase displacement techniques generally comprise introducing into the reservoir through an injection well a fluid or fluids which are miscible with the reservoir oil and serve to displace the oil from the pores of the reservoir and drive it into a production well. The miscible fluid is introduced into the injection well at a sufficiently high pressure that the body of fluid may be driven through the reservoir where it collects and drives the reservoir oil to the production well.

Miscible flooding techniques generally are categorized into three groups, namely, (1) the high-pressure gas method, (2) the enriched gas method, and (3) the miscible slug process.

The high-pressure gas method comprises in-situ development, that is, production within the reservoir itself, of a miscible fluid phase by the injection of a normally gaseous material such as a gas containing a large amount of methane. Injection is carried out at pressures above about 3000 pounds per square inch, and the gas, as it enters the formation, vaporizes low boiling hydrocarbons from the reservoir oil until such time that the gas, enriched with vaporized hydrocarbons, becomes miscible with the reservoir fluid. This enriched gas, which is miscible with the reservoir fluid, drives the reservoir fluid. The enriched gas is in turn driven by the injected gas.

In the enriched gas method, the first injected medium comprises a gas which is enriched with hydrocarbons heavier than methane, such as propane and minor amounts of butane and pentane. After injection, the reservoir oil absorbs light hydrocarbons ($C_2$, $C_3$, $C_4$, and $C_5$) from the injected enriched gas until such time that the reservoir oil becomes miscible with the enriched gas. Also, the enriched gas may comprise sufficient intermediate hydrocarbons to be immediately miscible with the reservoir oil. In either instance, the phase developed at the front of the injected enriched gas drives the reservoir oil through the formation and is in turn driven by a driving fluid which is more lean than the initially injected enriched gas. The pressure necessary to carry out the enriched gas process generally is about 1500 pounds per square inch gauge.

In the miscible slug method, a miscible fluid phase or liquefied slug is developed within the reservoir by injecting a condensible hydrocarbon, such as liquefied petroleum gas, propane, butane, or naphtha, at pressures such that the injected hydrocarbon will be established in liquid phase within the formation and thus may be driven through the formation to recover the reservoir oil. The pressures necessary to carry out the miscible slug technique usually are about 1000 pounds per square inch gauge. In carrying out the miscible slug technique, a driving gas is injected into the formation behind the condensible hydrocarbon slug in order to drive the slug through the reservoir formation to the production well.

In carrying out the various described miscible fluid displacement processes, it has been found that serious problems develop with respect to maintaining a uniform fluid front as the fluid progresses through the formation toward the production well. The uniformity to which the flood pattern, that is, the pattern assumed by the body of displacing fluid, may be held is generally referred to as the sweep efficiency of the flood. When the flood breaks away from a uniform frontal pattern, generally a portion of the flood will break through to the production well resulting in the leaving behind of substantial quantities of the reservoir oil. The sweep efficiency of a flood pattern is considered from the standpoint of both the horizontal and the vertical patterns of the flood. The horizontal pattern of a flood, that is, the configuration of the flood pattern in a horizontal plane extending through the formation perpendicular to the injection and production wells, is generally referred to as the areal sweep. The flood pattern along a perpendicular plane extending through the formation between the injection and production wells is referred to as the vertical sweep. The efficiencies of these patterns are, respectively, referred to as the horizontal sweep efficiency and the vertical sweep efficiency. The horizontal and vertical sweep efficiencies of a flood pattern are affected by several factors including the permeabilities of the various portions of the formation being treated. The permeability of a formation or a portion of a formation is a measure of the ease with which a fluid may flow through the formation. The permeability of a formation to a particular fluid is affected not only by the factors such as pore size and configuration but also by the fluids which may also be in the formation such as water and oil. The presence of a highly permeable zone within a formation, that is, a zone which is highly permeable relative to other zones within the formation, reduces the sweep efficiency of a flood pattern moving through the formation in that the fluids comprising the flood tend to migrate to and flow more readily through the highly permeable zone than they do through the less permeable zones. This condition results in an irregular flood pattern; in other words, portions of the flood pattern advance at a more rapid rate than other portions of the formation and ultimately break through to the production well leaving behind substantial quantities of oil and prematurely reducing the effectiveness of the flood. Another condition which is known to exist, particularly with respect to the areal sweep of a flood pattern, is the tendency of the center portion of the flood pattern, that is, the portion of the flood pattern in the vicinity of a line drawn directly between the injection and production wells, to advance or accelerate at a rate more rapid than the advance of those portions of the flood pattern which are off center or more nearly toward the sides of the pattern. In addition to reducing the amount of oil which is recovered, poor sweep efficiency may result in the use of unnecessarily large quantities of the material being used to effect the flood.

One solution which has been suggested to improve the sweep efficiency of a flood pattern is the injection of water through the input well into the reservoir. The injected water functions to form a water bank which will partially block the more permeable portions of the formation and result in a smoothing out of the forward boundary of the flood pattern. The water also serves to reduce the mobility of the driving fluids which are injected following the water. This is particularly important with respect to the areal sweep efficiency of a flood pattern moving through a substantially homogeneous formation. By reducing the permeability of the formation to those fluids following the water in an areal sweep pattern, the forward advance of the centermost portion of the pattern is reduced to lessen the tendency toward early breakthrough into the production well. While the injection of water has these and other specified advantages, there are certain disadvantages to the process. For example, a ready supply of large quantities of water is necessary. Also, expensive pumping equipment for the purpose of injecting the water is necessary. A further disadvantage of water injection is that there is a certain degree of impairment of gas injectivity due to the collection of large quantities of water immediately adjacent to the input well.

Almost universally, large quantities of water are inherent to hydrocarbon reservoirs. This water, which is commonly referred to as interstitial water, exists within the pores of the reservoir in quantities which may comprise up to 50 percent of the pore space of the reservoir. It has been found that this interstitial water may be employed for the purpose of forming a water bank in a reservoir to provide selective water blocking and reduce the mobility of the various fluids employed in carrying out a miscible fluid displacement process.

In accordance with the invention, the desired water bank is established within a formation in conjunction with the carrying out of a miscible fluid displacement process by the injection of liquid ammonia into the formation and moving the liquid ammonia into contact with the interstitial water, thus forming the interstitial water into a water bank along the front of the flood pattern.

It is one object of the present invention to provide an improved form of secondary recovery of hydrocarbon oil of the miscible fluid displacement type. It is another object of the present invention to provide a miscible fluid displacement method of secondary recovery of hydrocarbon oil wherein the areal and vertical sweep efficiencies of the flood pattern employed are improved by the establishment of a water bank comprising the interstitial water inherent to the formation. It is another object of the invention to provide a method of establishing a water bank within a hydrocarbon formation for the purpose of partially blocking the more permeable zones of the formation. It is another object of the invention to provide a method of reducing the amount of miscible material normally taken by the more highly permeable zones within a hydrocarbon reservoir during a miscible fluid displacement type of secondary recovery process. It is another object of the present invention to provide a method of establishing a water bank within a subterranean reservoir without the necessity of employing an outside source of supply of water. It is a further object of the invention to establish a water bank within a hydrocarbon reservoir during a miscible fluid displacement type of secondary recovery process wherein the injectivity of gas driving fluid is not impaired to the same extent that might be so if the water were injected from an outside source into the reservoir. These and further objects of the invention will be apparent from a reading of the following specification taken in conjunction with the accompanying drawings.

Figure 1:
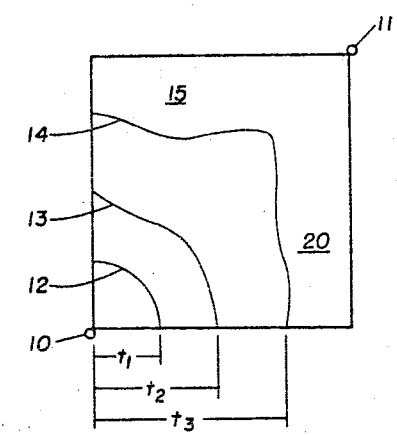
FIGURE 1 is a diagrammatic representation illustrating the configuration of the front boundary of an areal sweep pattern at various stages during a conventional miscible fluid displacement process.

In accordance with one embodiment of the invention, petroleum oil is recovered from an oil-containing subterranean formation provided with an input well and at least one output well by a procedure which involves among other steps the step of creating in-situ from interstitial water a water bank along the forward boundary of the sweep pattern for the purpose of improving both the areal and vertical sweep efficiencies. The first step in this procedure comprises injecting through the input well into the formation a quantity of liquid ammonia at a pressure sufficient to drive the liquid ammonia through the formation into contact with the interstitial water of the formation and thereby establish a water bank within the formation. The second step in the process involves the establishment of a fluid phase within the formation behind the water bank of step 1, which fluid phase is comprised of a fluid which is miscible both with the injected ammonia and with the reservoir oil. The third step of the process of the invention involves the employment of a driving fluid to force the water bank of step 1 and the miscible fluid phase of step 2 through the reservoir toward the production well and producing reservoir oil from the production well.

Frequently in carrying out a miscible fluid displacement process of the type disclosed herein, the well known 5-spot pattern of well positioning will be employed. In the 5-spot pattern of well placement, four production wells are located equally spaced apart at the corners of a square with a single injection well being positioned at the center point of the square. For purposes of simplicity of illustration, FIGURES 1-4 are schematic diagrams of only one quadrant of a conventional 5-spot pattern of well placement. It is to be understood that the other three quadrants of a 5-spot pattern which have not been shown would each contain a production well at the corner of the quadrant along the diagonal of the square opposite the input well. The areal sweep patterns in the quadrant which have not been illustrated would be similar in configuration to the areal sweep patterns illustrated in FIGURES 1-4.

Referring to the drawings, input well 10 penetrates the formation from which oil is to be produced by the miscible fluid displacement process of the invention. Production well 11 penetrates the same formation and is employed for the purpose of conducting the oil produced from the formation to the surface. Between input well 10 and production well 11 there is illustrated the portion of the formation from which the oil to be recovered through production well 11 is displaced.

Referring specifically to FIGURE 1, the lines 12, 13, and 14 represent the configuration of the forward boundary of an areal sweep pattern of a conventional miscible fluid displacement process at various times subsequent to the initiation of the process from input well 10. The purpose of illustrating the sweep pattern of a conventional process as shown in FIGURE 1 is to provide a basis of comparison of the areal sweep pattern obtained when the miscible fluid displacement process of this invention is employed. Line 12 illustrates the forward boundary of the conventional areal sweep pattern at a time $t_1$ after injection was initiated through well 10. The time $t_1$ is relatively soon after injection began. It is to be observed that all points along line 12 lie substantially the same distance from well 10 and therefore it may be concluded that the advance of the flood pattern after the elapse of time $t_1$ has been at substantially the same rate at all points along the forward boundary of the pattern. Line 13 represents the forward boundary of the areal sweep pattern after a further amount of time, $t_2$, has elapsed, and consequently the flood has progressed farther into the formation toward the production well. It will be observed that the center portion of the flood front boundary, that is, the portion in the vicinity of a line drawn between well 10 and well 11, is beginning to move forward or advance at a more rapid rate than those portions of the flood front which are farther from the center of the front. The configuration of the flood front after time $t_2$ is beginning to get out of round with a protuberance developing along the center of the front, the points along the protuberance being points of advance of the flood front which are moving more rapidly than those which lie away from the protuberance. These points along the protuberance are at a greater distance from the input well than those which lie along the boundaries or, in other words, near the end of line 13. Line 14 represents the configuration of the forward boundary of the sweep pattern after the elapse of time $t_3$. It will be noted that the center portion of the boundary front, represented by line 14, is continuing to accelerate at a more rapid rate than the outer portions of the boundary front, and thus at the time $t_3$ the center section of the boundary front is becoming more pointed in shape in the direction of the production well 11. It is believed that the acceleration of the center portion of areal sweep patterns, as illustrated in FIGURE 1, is due to the fact that the pressure drop per unit length is greater along the center portion of the front than the pressure drop per unit length along the outer portions of the pattern front. During the carrying out of a fluid displacement process, the pressure differential between the input well 10 and the output or production well 11 is maintained at a constant value. It can be seen from this, then, that the pressure drop per unit length along a straight line connecting the input and output wells would be greater than the pressure drop along lines extending from the input well through the outer boundaries of the flood front to the production well. It is to be understood that as the flood front advances, as shown in FIGURE 1, oil within the formation between the flood front and the production well 11 is driven from the formation into the production well. The sections 15 and 20 of the formation residing on either side of a line between input well 10 and production well 11 represent the portions of the formation which are in advance of the flood front and still contain unrecovered oil.

Figure 2:
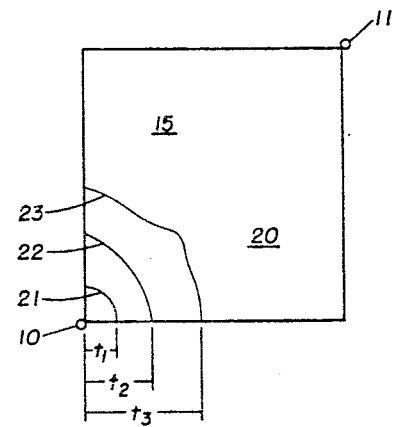
FIGURE 2 is a diagrammatic representation of the configuration of the forward boundary of an areal sweep pattern at various stages of a fluid displacement process practiced in accordance with the present invention.

FIGURE 2 diagrammatically illustrates the configuration of the front boundary of an areal sweep pattern of a fluid displacement process carried out in accordance with the invention under the same reservoir condition as illustrated in FIGURE 1. The various flood front positions illustrated in FIGURE 2 by lines 21, 22, and 23 represent the same elapsed times after injection as shown in FIGURE 1 by lines 12, 13, and 14, respectively. For purposes of appreciating the benefits derived from the process of the invention as compared with a conventional miscible fluid displacement process, FIGURES 1 and 2 must be considered and compared together. For example, it will be noted in FIGURE 2 that after an elapsed time after injection of $t_1$, the flood front, as represented by line 21, has not advanced as far as the flood front represented by line 12 in FIGURE 1 after the same elapsed time after injection of $t_1$. Referring to FIGURE 2, after the time $t_2$ has elapsed, it will be observed that the flood front as represented by line 22 has continued to maintain its circular configuration and is closer to the injection well 10 than the flood front shown by line 13 in FIGURE 1 which is farther from the injection well 10 and has begun to develop a bulge or protuberance along the center line of the front. While, after time $t_3$ has passed subsequent to injection, the flood front in FIGURE 2 as shown by line 23 is beginning to develop a slight bulge along its center portion, it does not have the decidedly pointed shape which is developing in the conventional process shown in FIGURE 1 by line 14 after the same elapsed time $t_3$.

Figure 3:
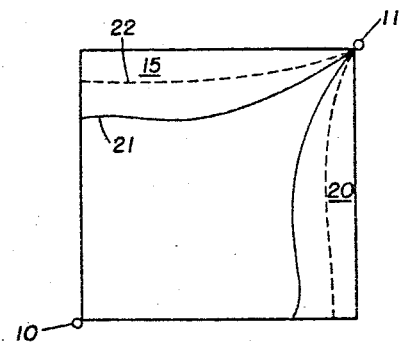
FIGURE 3 is a diagrammatic illustration of the forward boundaries of areal sweep patterns at the moment of breakthrough into the production well of both a conventional displacement process and a fluid displacement process practiced in accordance with the invention.

It is well recognized that in practicing all miscible fluid displacement type processes a time arrives subsequent to injection of the driving materials employed when the driving materials break through to the production well. The point of breakthrough of the flood pattern is determined by the appearance in the production well of the material being employed to displace the reservoir oil from the formation into the production well. While the production of oil does not necessarily cease at the time of breakthrough, the efficiency of the flooding process does begin to decrease and the ratio of driving fluids to oil in the production well begins to increase. FIGURE 3 diagrammatically illustrates a comparison of the relative positions of the flood fronts at the time of breakthrough of a conventional miscible fluid displacement process and a miscible fluid displacement process carried out in accordance with the invention. The line 21 in FIGURE 3 represents the configuration of the forward boundary of an areal sweep pattern in a conventional miscible fluid displacement process, while the line 22 represents the configuration of the forward boundary of the same type of flood pattern obtained in carrying out the process of the invention. It will be observed from FIGURE 3 that the portion of the formation which has been swept up to the time of breakthrough by the process of the invention, as represented by line 22, encompasses a greater portion of the formation than that portion of the formation which was swept by conventional processes, as represented by line 21. It is to be understood that the formation shown between the respective flood fronts indicated and the injection well 10 have been swept by the displacement processes. It may be observed in FIGURE 3 that the unswept portions of the formation at the time of breakthrough, as represented by portions 15 and 20, are smaller in the case of the process of the invention, as represented by line 22, than in the case of the conventional displacement process, as represented by line 21. It is therefore seen that the net recovery of oil through the production well at the time of breakthrough is larger in the case of the process of the invention than in that of a conventional miscible fluid displacement process. By employing the process of the invention, the configuration of the front boundary of the flood pattern has been altered with the net result being the sweeping of a greater portion of the formation and the obtaining of increased recovery of reservoir oil. It is believed that the improvement in the flood pattern illustrated in FIGURES 2 and 3 derived by practice of the process of the invention is brought about by the change in mobility ratio obtained by the establishment of the water block in advance of the driving fluids. The mobility of fluid is a measure of the ease with which the fluid moves through a formation. It follows, therefore, that the mobility ratio of several fluids is a measure of the relative ease with which the various fluids move through a formation. Where the mobility ratio of driving fluids to driven fluids is infinite, as when gas is driving reservoir oil, it is known that the total oil recovery at the time of breakthrough is approximately 63 percent; whereas, in the case where the mobility ratio of driving to driven fluids may be brought down to the order of 1 to 1, the total oil recovery at the time of breakthrough is raised to approximately 72 percent. By the establishment of a water block, in accordance with the invention, along the front boundary of the sweep pattern, the mobility of the driving fluids, liquefied petroleum gas, gases such as methane, and enriched gases, is reduced and brought into the order of magnitude of the mobility of the reservoir fluids.

While FIGURES 2 and 3 have shown the application of the invention to flood processes carried out in substantially homogeneous reservoirs, that is, reservoirs having substantially uniform permeability throughout, it is to be understood that the process of the invention is equally applicable to and highly beneficial in nonhomogeneous reservoirs. Nonhomogeneous reservoirs are reservoirs in which there are portions which have permeabilities which vary from the permeabilities of other portions of the reservoir.

Figure 4:
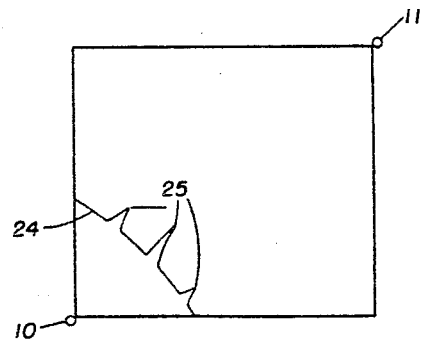
FIGURE 4 illustrates diagrammatically the forward boundary of an areal sweep pattern of a conventional fluid displacement process under conditions of varying horizontal permeability of the reservoir formation.

FIGURE 4 illustrates the forward boundary of an areal sweep pattern in a conventional miscible fluid displacement process where variations exist in the horizontal permeability of the formation. Line 24 represents the forward boundary of the areal sweep pattern at a stage in the conventional process subsequent to introduction of miscible fluids into injection well 10. The pips 25 illustrate points along the forward boundary of the pattern at which the pattern has advanced due to nonuniformity of the permeability of the reservoir. At these points, the formation has portions which have relatively higher permeability and thus the miscible fluids advance more rapidly into them, resulting in the development of a jagged or uneven forward boundary in the areal sweep pattern. The practice of the present invention is advantageous not only in improving the sweep pattern in a homogeneous reservoir but is also applicable to horizontal, nonhomogeneity as illustrated in FIGURE 4. When fluids are introduced into a reservoir of the type illustrated in FIGURE 4, the fluids obviously will advance more rapidly into the portions which are of a higher permeability. Therefore, it will be readily understood that when ammonia is introduced into such a formation, those portions of the formation of higher permeability will preferentially take the ammonia with the resultant building of a water bank from the interstitial water which will be of greater magnitude than the water bank being established in those portions of lesser permeability. The net effect of the practice of the invention in such a reservoir is, therefore, a smoothing out of the forward boundary of the areal sweep pattern due to the establishment of the larger water bank in those portions of higher permeability. The pips 25 will be either eliminated or appreciably reduced in size such that the forward boundary will present a much more smooth appearance.

The present invention is also applicable for the purpose of improving the vertical sweep efficiency of a miscible fluid displacement process. Formations from which oil is obtainable often exist in the form of a plurality of horizontal layers or strata. These horizontal strata may each be substantially homogeneous and yet the permeability of some of the horizontal strata may be appreciably greater than the permeability of others in the same formation. When such a condition exists, those strata having the higher permeability will preferentially take the displacement fluids, resulting in very poor vertical sweep efficiency of the over-all displacement process. The forward boundary of the displacement fluids entering the strata of higher permeability will advance at a more rapid rate than the forward boundary of the displacement fluids entering the strata of lower permeability. At times, the displacement fluids may advance completely through the portions of higher permeability and break through into the production well long before the displacement fluids have advanced far enough into the portions of lower permeability to effect any appreciable oil recovery from those latter portions of the formation.

Figure 5:
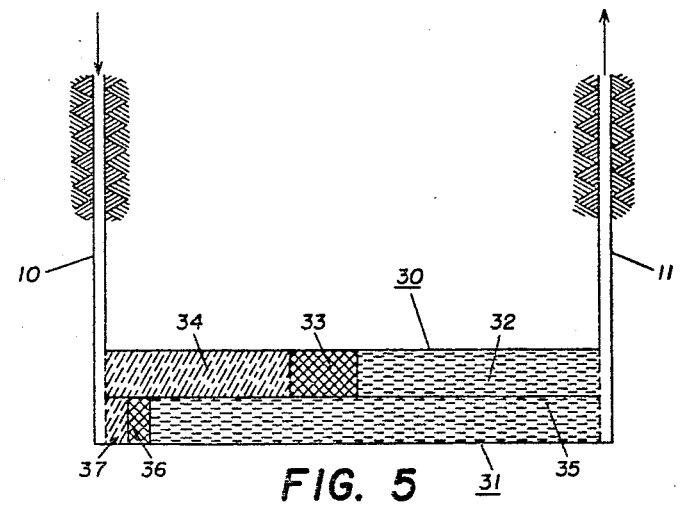
FIGURE 5 is a schematic diagram showing in vertical section through a reservoir formation a stage in the practice of a conventional fluid displacement process.
Figure 6:
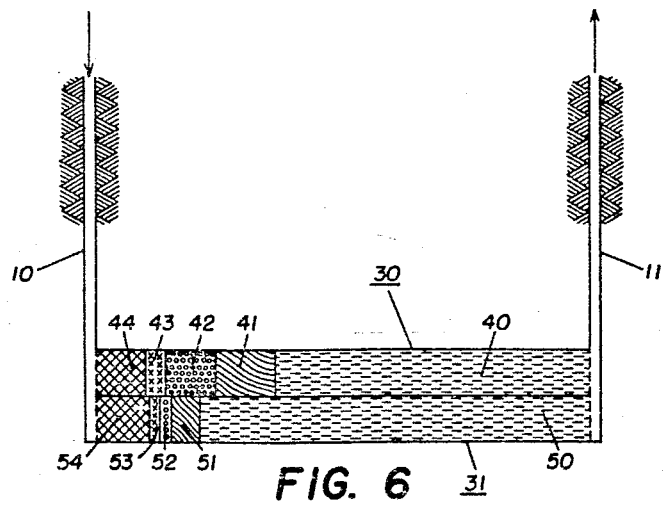
FIGURE 6 illustrates in schematic form a vertical section through a reservoir formation showing a stage in a miscible fluid displacement process practiced in accordance with the invention.

FIGURES 5 and 6 are schematic diagrams illustrating a vertical section through an oil reservoir in which a miscible fluid displacement process is being carried out. Input well 10 serves to conduct the displacement fluids into the reservoir, while output or production well 11 serves to conduct the recovered oil from the reservoir. While, for purposes of simplicity of illustration, only two strata have been illustrated in FIGURES 5 and 6, it is to be understood that a formation may be comprised of many such strata. In both FIGURES 5 and 6, the upper stratum 30 has a higher permeability than the lower stratum 31. FIGURE 5 shows the carrying out of a conventional miscible fluid displacement process wherein liquefied petroleum gas or a similar condensible hydrocarbon material is introduced into the formation through injection well 10 followed by a driving gas such as methane. In the upper stratum 30, reservoir oil 32 is being displaced into the production well 11 by miscible fluid slug 33 which in turn is driven by gas 34. In the lower stratum 31, the reference numeral 35 designates the reservoir oil being displaced into production well while the reference numeral 36 designates a slug of miscible fluid which is driving the reservoir oil. The miscible fluid is driven by driving fluid 37. Due to the higher permeability of upper stratum 30, the displacing fluids are preferentially taken by that stratum, resulting in larger quantities of the displacing fluids flowing into the upper stratum and thereby driving the reservoir oil through and from the upper stratum at a more rapid rate than occurs in the lower stratum 31. It will be observed that in the particular stage of the process illustrated the miscible fluid front is much farther advanced into the formation in the upper stratum than in the lower stratum.

FIGURE 6 illustrates a stage in the carrying out of a miscible fluid displacement process in accordance with the invention in a formation identical to that illustrated in FIGURE 5. In FIGURE 6, reservoir oil 40 is displaced into the production well 11 from stratum 30 by the driving fluids. Liquid ammonia, which has been injected into the formation through input well 10, preferentially flows in larger quantities into more permeable upper stratum 30 to establish an interstitial water bank which is represented by the reference numeral 41. Behind the established water bank 41 is a transition zone 42 which comprises ammonia water which is a mixture of the injected ammonia and the interstitial water. Behind the ammonia water 42 is a narrower band of pure ammonia 43 which is followed by a slug of liquefied hydrocarbons 44. In the lower stratum 31, which is the less permeable of the two strata illustrated, the reference numeral 50 represents the reservoir oil; 51, the established water bank; 52, the ammonia water; 53, the narrow band of pure ammonia; and 54, the slug of liquefied hydrocarbon material. The forward boundary of each of the flood patterns illustrated exists at the forward face, that is, the face nearer the production well 11, of the sections of water 41 and 51, respectively. In an ideal situation, of course, the forward boundaries of water sections 41 and 51 would be coincident with the resultant complete smoothing of the forward boundary of the vertical sweep pattern through the formation. While the complete ideal may not be achieved in all instances, appreciable improvement will be obtained in the vertical sweep pattern through the formation by the practice of the invention, as illustrated by a comparison of FIGURE 6 with FIGURE 5 which shows that the forward advance of the flood pattern in the upper stratum 30 as compared with the lower stratum 31 has been reduced as shown in FIGURE 6. While complete uniformity of the flood pattern will not always be obtained, the preferential taking of the fluids by the more permeable stratum results in a greater reduction in the mobility ratio of the fluids in the more permeable stratum as compared with that in the less permeable stratum to make the advance rate of the fluids through each of the strata more nearly equal. The recovery of oil from the less permeable stratum will therefore be increased up to the point of breakthrough of the flood pattern through the more permeable stratum.

In carrying out the first step of a miscible fluid displacement process in accordance with the invention, liquid ammonia is introduced into the formation through injection well 10 at a pressure sufficient to move the body of liquid ammonia into contact with the interstitial water of the formation, form a bank of interstitial water, and drive the bank through the formation toward the production well 11.

The following example is illustrative of the fact that introduction of liquid ammonia into a formation containing interstitial water will result in the ammonia coacting with the interstitial water to form the desired water bank within the formation. A tube of copper, 50 feet long and 3/8 inch in diameter, was formed into a helical coil having an outside diameter of 24 inches. The tube was packed with sand which in turn was saturated with water. The water was then displaced with Sovasol (a hydrocarbon cut boiling between 300° F. and 400° F.) until the water saturation within the sand was 7.5 percent of the pore volume of the sand. This left the sand saturated with 92.5 percent Sovasol and 7.5 percent water. Quantitatively, there was 233.3 cc. of Sovasol and 19.0 cc. of water within the sand pack. Liquid ammonia was then injected into the sand pack at the rate of 63.8 cc. per hour. The liquid ammonia formed a water bank within the sand pack from the interstitial water and, with continued driving of both the liquid ammonia and the established water bank, oil was displaced from the sand pack until water breakthrough at the production end of the sand pack occurred, at which time 71 percent of the oil had been displaced from the sand pack. Water was then produced, along with some oil, from the production end of the sand pack until ammonia water broke through. At this time, about 82 percent of the original water had been produced from the sand pack. Production of water from the sand pack was continued until all of the water originally present within the pack had been produced. It was found that there was present in the produced water 1.5 grams or 2.43 cc. of ammonia, which was equivalent in volume to 0.96 percent of the total pore volume of the sand pack. It is thus seen from this example that all of the interstitial water within a formation may be formed into a water bank and produced from the formation by a quantity of ammonia which in amount is less than one percent of the total pore volume of the formation.

While mixing zone length, for example, the zone in which there exists a mixture of water and ammonia, obviously will increase as the displacement fluids progress through a formation, it has been established that the lengths of such zones do not increase directly in proportion to the distance traveled by the displacing mediums. It is recognized that the increase in mixing zone length is approximately in proportion to the square root of the distance traveled by the fluids rather than being linear. While in the example illustrated miscible displacement occurred over a distance of approximately 50 feet, in actual practice the distances between injection and production wells may be on the order of 1000 to 1600 feet. Therefore, if, for example, the mixing zone between the interstitial water and ammonia grew to a length of 10 feet in a traveled distance of 50 feet, the length of the mixing zone between the water and ammonia during a travel of 1600 feet would be in accordance with the following:

$$\frac{10}{X} = \frac{\sqrt{50}}{\sqrt{1600}} \text{ or } X = \frac{10\sqrt{1600}}{\sqrt{50}} = 56.6 \text{ ft.}$$

where X represents the length of the mixing zone for a travel distance of 1600 feet.

While the actual length of mixing zones is not directly of concern here, it is pertinent to know the relationships existing with respect to the growth of mixing zone lengths inasmuch as the mixing zone lengths are indicative of the quantity of fluid which must be injected to accomplish the desired end result. From the relationships shown above, it has been found that the percentage requirements of injected fluid are inversely proportional to the square roots of the distances involved. For example, it was found that in a travel distance of 50 feet in the above-illusttrated example a quantity of ammonia equal in volume to approximately one percent of the pore volume of the sand pack formed a water bank which was produced from the formation. Therefore, the ammonia required for a travel distance of 1600 feet may be ascertained as follows:

$$\frac{1.0}{X} = \frac{\sqrt{1600}}{\sqrt{50}} \text{ or } X = \frac{\sqrt{50}}{\sqrt{1600}} \quad X = 0.177 \text{ percent}$$

where X equals the amount of ammonia in terms of the percentage of the pore volume of the formation which must be injected where the production and injection wells are spaced apart 1600 feet.

While the above example illustrates the ammonia requirements for establishing a water bank from interstitial water and producing the entire amount of interstitial water from the formation, it is to be understood that it is not necessarily always desirable to displace all of the interstitial water to or out of the production well. It may be desired that the ammonia be consumed in the water before it has established a large enough water bank to actually reach the production well, in which case smaller quantities of ammonia may be employed. It is believed that as the ammonia is dissipated in the water during movement through the formation, the water will gradually re-enter various pores of the formation and for this and other reasons will gradually be left behind and bypassed by the displacing fluids. The quantity of ammonia necessary where complete water production is not desired may be readily ascertained by the carrying out of experiments of the type illustrated above.

While the above example has illustrated that liquid ammonia may be injected into a formation and will readily establish a water bank therein prior to the introduction of the miscible displacement fluids which are to be employed, it may be desirable to introduce the liquid ammonia subsequent to the introduction of a liquefied petroleum gas slug, during the introduction of such a slug, or even during the driving gas injection stage. In an experiment carried out in the same manner as described above, the step of displacing the water with Sovasol was followed by flowing propane through the sand pack. Following the propane, liquid ammonia was introduced into the sand pack and a water bank was established as the propane was produced from the pack, thus establishing that the ammonia may be introduced following a miscible hydrocarbon driving fluid.

In carrying out the process of the invention, the step of introducing the liquid ammonia into the formation through the injection well may be accomplished in several different ways. It is well understood that in introducing a fluid into a formation having portions thereof of various permeabilities the flow of the fluid will be somewhat self-regulating in that those portions of the formations of higher permeability will take the greater volume of the introduced fluid. Since it is the objective in dealing with this type of formation to establish a water bank of greater magnitude within the more permeable portions, the ammonia may be introduced into an open wellbore from which it will flow preferentially into the portions of the formation of greater permeability. This is the simplest form of fluid introduction and is preferred in those instances where there is no objection to some of the ammonia going into the less permeable portions of the formation. Where it is desired that all of the ammonia go only into the more permeable portions of the formation, the less permeable zones may be packed off in order to force all of the ammonia into the more permeable zones. While this practice is not feasible with horizontal variations in permeability, it may be readily carried out in those instances where the problem exists with variations in the vertical permeability of the formation. In other words, where the formation is made up of a plurality of horizontal strata, some of which are more permeable than others, the less permeable strata are packed off in order to force the liquid ammonia into the more permeable strata. In this instance, the quantity of ammonia to be used is based upon the pore volume of the more permeable portions of the formation into which the ammonia is to be actually injected.

The actual quantity of liquid ammonia to be employed in carrying out the process of the invention will vary depending upon the conditions under which the process is carried out. For example, if it is desired to establish a water bank and drive substantially all of the interstitial water of the formation into the production well, the quantity of ammonia used may approximate a maximum of one percent of the pore volume of the reservoir. On the other hand, where it is desired to minimize the quantity of interstitial water which is produced from the formation, it is preferred that the quantity of ammonia be within the range of about 0.05 to 0.8 percent of the pore volume of the reservoir. The term "pore volume" as used herein means the volume of the pores of the portion of the reservoir which is to be swept by the miscible fluid displacement process of the invention. This pore volume may be ascertained by various well-known procedures, including the analysis of sample cores taken by drilling into the formation.

The step of introducing liquid ammonia may be carried out at various times during the practice of a miscible fluid displacement process in accordance with the invention. In one embodiment of the invention, the liquid ammonia is introduced into the formation and forced into contact with the interstitial water to form a water bank. The ammonia is followed by a slug of liquefied petroleum gas and the water bank, ammonia, and liquefied petroleum gas, along with the reservoir oil, are driven through the formation by a driving gas until the production coming from the output well comprises substantially the driving gas. It is also contemplated that, in carrying out this embodiment of the invention, the liquid ammonia may be introduced simultaneously with the liquefied petroleum gas slug or it may be introduced subsequent to the injection of the liquefied petroleum gas slug prior to the introduction of the driving gas fluid.

In another form of the invention, liquid ammonia is initially introduced into the formation and followed by a normally gaseous material such as a gas containing a large amount of methane which is injected at a pressure in excess of about 3000 pounds per square inch. A water bank is established by a miscible hydrocarbon phase. Both are driven by the injected gas.

In another form of the invention, liquid ammonia is initially introduced into the formation through the injection well and followed by a driving gas which is enriched with hydrocarbons heavier than methane such as propane and minor amounts of butane and pentane. A lean gas then is injected to drive the established water bank and miscible hydrocarbon phase through the formation to recover reservoir oil. In this latter method, the pressure necessary to carry out the process generally is about 1500 pounds per square inch.

While the process of the invention has been principally discussed in terms of miscible fluid displacement of oil from reservoir formations, it is to be understood that it is equally usable in connection with such processes as the cycling of condensate reservoirs. A condensate reservoir is a formation containing gas and condensible hydrocarbons. Such a reservoir is penetrated by production and injection wells to permit the cycling procedure to be carried out. The gas and condensible hydrocarbons are removed from the reservoir through the production wells and passed through a separation apparatus in which the condensible hydrocarbons are removed. Subsequent to the removal of the condensible hydrocarbons, the dry gas is again introduced into the reservoir through the injection wells for the purpose of driving more gas and condensible hydrocarbons to the surface through the production wells. The procedure of cycling condensate reservoirs is analogous to the other discussed miscible fluid displacement processes in that the reinjected dry gas acts as a driving fluid for the purpose of increasing the total recovery from the formation. The sweep efficiency of the flood pattern of the reinjected gas may be improved by the intermittent introduction of quantities of liquid ammonia for the purpose of establishing water banks from the interstitial water of the formation in order to reduce the mobility of the reinjected gas. In this application of the invention, it is preferred that the quantity of ammonia be held to the lower end of the operable range in order that the interstitial water will not all be driven from the formation. It is preferred that, after the establishment of a sufficient water bank to improve the sweep efficiency of the reinjected gas, the interstitial water be permitted to remain within the formation in order that it may be utilized to the fullest extent throughout the period of cycling of the condensate reservoir in order to avoid the necessity of injection of water from outside sources.

While the invention has been discussed in the light of certain specific embodiments disclosed herein, it is to be understood that such descriptions have been given only by way of illustration and example and not by way of limitation, reference for the latter purpose being had to the appended claims.

What is claimed is:

1. In the secondary recovery of oil from a subterranean formation penetrated by at least one injection well and one production well wherein a hydrocarbon fluid is injected into said formation through said injection well to displace said oil from said formation through said production well, a method of improving the sweep pattern of said fluid which comprises injecting liquid ammonia into said formation through said injection well, the quantity of said ammonia being no more than one percent of the pore volume of said formation, driving said ammonia through said formation into contact with the interstitial water of said formation to form a water bank of said water, and driving said water bank through said formation toward said production well by means of said fluid.

2. In the method of claim 1 wherein the quantity of said liquid ammonia is within the range of 0.05 to 0.8 percent of the pore volume of the portion of said formation swept by said fluid.

3. In the secondary recovery of oil from a subterranean formation comprising portions of varying permeabilities wherein a hydrocarbon fluid is injected into said formation through an injection well leading thereto to displace said oil from said formation through a production well leading therefrom, a method of improving the sweep pattern of said fluid which comprises injecting liquid ammonia through said injection well into the portions of said formation of higher permeability, the quantity of said ammonia being no more than one percent of the pore volume of said portions of said formation of higher permeability, driving said ammonia through said portions of said formation of higher permeability into contact with the interstitial water of said portions of said formation of higher permeability to form water banks of said water, and forcing said water banks and said oil through said formation by means of said fluid.

4. In the method of claim 3 wherein the quantity of said liquid ammonia is within the range of 0.05 to 0.8 percent of the pore volume of said portions of said formation of higher permeability.

5. In the secondary recovery of oil from a subterranean formation comprising portions of varying permeabilities wherein a hydrocarbon fluid is injected into said formation through an injection well leading thereto to displace said oil from said formation through a production well leading therefrom, a method of improving the sweep pattern of said fluid which comprises packing off the portions of said formation of lower permeability, injecting liquid ammonia through said injection well into the portions of said formation of higher permeability, the quantity of said ammonia being no more than one percent of the pore volume of said portions of said formation of higher permeability, driving said liquid ammonia into contact with the interstitial water in said portions of said formation of higher permeability to establish therein water banks of said water, unpacking the portions of said formation of lower permeability, and forcing said fluid and said water banks through said formation to displace said oil therefrom through said production well.

6. The method of claim 5 wherein the quantity of said liquid ammonia is within the range of 0.05 to 0.8 percent of the pore volume of the portions of said formation of higher permeability.

7. The method of recovering oil from a subterranean formation penetrated by at least one injection well and one production well which comprises the steps of injecting liquid ammonia through said injection well into said formation, the quantity of said ammonia being no more than one percent of the pore volume of said formation, driving said ammonia through said formation into contact with the interstitial water of said formation to form a water bank of said water, injecting through said injection well into said formation a gas driving fluid comprising substantially methane at a pressure in excess of about 3000 pounds per square inch, forcing said driving fluid into contact with said water bank, and driving said fluid, said water bank, and said oil through said formation to said production well until the flow from said production well comprises substantially said driving fluid.

8. In the method of claim 7 wherein the quantity of liquid ammonia is within the range of 0.05 to 0.8 percent of the pore volume of the portion of said formation from which oil is recovered by said method.

9. The method of recovering oil from a subterranean formation penetrated by at least one injection well and one production well which comprises the steps of injecting through said injection well into said formation a driving fluid comprising substantially methane at a pressure above about 3000 pounds per square inch, injecting liquid ammonia through said injection well into said formation coincident with the introduction of said driving fluid, the quantity of said ammonia being no more than one percent of the pore volume of said formation, forcing said driving fluid and said liquid ammonia through said formation into contact with the interstitial water and oil in said formation whereby a water bank is established from said interstitial water by the coaction of said ammonia with said water to reduce the mobility of said driving fluid through said formation, and producing oil from said formation through said production well until the fluid flowing from said production well comprises substantially said driving fluid.

10. In the method of claim 9 wherein the quantity of liquid ammonia is within the range of 0.05 to 0.8 percent of the pore volume of the portion of said formation from which oil is produced through said production well.

11. A method of secondary recovery of oil from a subterranean formation penetrated by at least one injection well and one production well wherein the sweep efficiency of said method is improved the steps which comprise injecting liquid ammonia through said injection well into said formation, the quantity of ammonia being no more than one percent of the pore volume of said formation, driving said ammonia through said formation into contact with the interstitial water of said formation to form a water bank of said water, injecting through said injection well into said formation behind said water bank a driving fluid comprising a hydrocarbon gas enriched with hydrocarbons heavier than methane, forcing said driving fluid into contact with said water bank, driving said fluid and said water bank through said formation toward said production well, and producing oil through said production well until the fluid flowing from said production well comprises substantially said driving fluid.

12. In the method of claim 11 wherein the quantity of liquid ammonia is within the range of 0.05 to 0.8 percent of the pore volume of the portion of said formation from which said oil is produced through said production well.

13. The method of secondary recovery of oil from a subterranean formation penetrated by at least one injection well and one production well wherein the sweep efficiency of said method is improved which comprises the steps of injecting liquid ammonia through said injection well into said formation, the quantity of said ammonia being no more than one percent of the pore volume of said formation, driving said ammonia through said formation into contact with the interstitial water of said formation to form a water bank from said water, injecting through said injection well into said formation a condensible hydrocarbon fluid at sufficient pressure to establish said condensible hydrocarbon fluid as a liquefied slug within said formation behind said water bank, injecting through said injection well a driving fluid into said formation behind said liquefied slug, forcing said water bank, said liquefied slug, and said driving fluid through said formation toward said production well, and producing oil through said production well until the fluid flowing through said well comprises substantially said driving fluid.

14. In the method of claim 13 wherein the quantity of liquid ammonia is within the range of 0.05 to 0.8 percent of the pore volume of the portion of said formation produced through said production well.

15. The method of secondary recovery of oil from a subterranean formation penetrated by at least one injection well and one production well wherein the sweep efficiency of said method is improved which comprises the steps of injecting through said injection well into said formation a condensible hydrocarbon fluid at a pressure sufficient to establish said fluid as a liquefied slug within said formation, injecting liquid ammonia through said injection well into said formation behind said liquefied slug, the quantity of said ammonia being no more than one percent of the pore volume of said formation, driving said liquid ammonia into contact with the interstitial water of said formation to establish a water bank from said water, introducing a hydrocarbon driving fluid into said formation, forcing said liquefied slug, said water bank, and said driving fluid through said formation toward said production well, and producing oil from said formation through said production well until the fluid flowing through said production well comprises substantially said driving fluid.

16. In the method of claim 15 wherein the quantity of liquid ammonia is within the range of 0.05 to 0.8 percent of the pore volume of the portion of said formation pro- References Cited in the file of this patent

UNITED STATES PATENTS

| | | |
|---|---|---|
| 2,776,714 | Stanclift et al. | Jan. 8, 1957 |
| 2,813,583 | Marx et al. | Nov. 19, 1957 |

OTHER REFERENCES

Clark, N. J., et al.: "Latest Oil Recovery Idea," Petroleum Engineer, September 1957, pp. B–21–B–26.

Kieschnick, W. F., Jr.: "What is Miscible Displacement?," Petroleum Engineer, August 1959, pp. B–56–N–98.

---

UNITED STATES PATENT OFFICE
CERTIFICATE OF CORRECTION

Patent No. 3,123,136                  March 3, 1964

Lorld G. Sharp

It is hereby certified that error appears in the above numbered patent requiring correction and that the said Letters Patent should read as corrected below.

Column 11, line 59, for "port" read -- pore --; column 12, line 10, after "established" insert -- followed --; column 16, line 12, for "N-98" read -- B-98 --.

Signed and sealed this 20th day of October 1964.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,123,136            March 3, 1964

Lorld G. Sharp

It is hereby certified that error appears in the above numbered patent requiring correction and that the said Letters Patent should read as corrected below.

Column 11, line 59, for "port" read -- pore --; column 12, line 10, after "established" insert -- followed --; column 16, line 12, for "N-98" read -- B-98 --.

Signed and sealed this 20th day of October 1964.

(SEAL)
Attest:

ERNEST W. SWIDER  
Attesting Officer

EDWARD J. BRENNER  
Commissioner of Patents